US008056049B2

(12) United States Patent
Bai et al.

(10) Patent No.: US 8,056,049 B2
(45) Date of Patent: Nov. 8, 2011

(54) METHOD AND SYSTEM FOR ANALYZING AND PRESENTING CONFLICTS IN MODEL TRANSFORMATION AND AUTOMATICALLY RECONCILING MODEL TRANSFORMATION

(75) Inventors: Xin Xin Bai, Bengbu (CN); Ying Liu, Chaoyang District (CN); Ying Hua Liu, Shanghai (CN); Jian Wang, Haidian District (CN); Xin Zhou, Chaoyang District (CN); Jun Zhu, Haidian District (CN)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 11/765,001

(22) Filed: Jun. 19, 2007

(65) Prior Publication Data

US 2008/0046864 A1 Feb. 21, 2008

(30) Foreign Application Priority Data

Aug. 15, 2006 (CN) .......................... 2006 1 0115735

(51) Int. Cl.
*G06F 9/44* (2006.01)
*G05B 13/02* (2006.01)
(52) U.S. Cl. ............ 717/105; 700/31; 717/109; 717/113
(58) Field of Classification Search .................. 717/104, 717/105
See application file for complete search history.

(56) References Cited

U.S. PATENT DOCUMENTS

| 5,911,074 | A | | 6/1999 | Leprince |
| 5,956,499 | A | * | 9/1999 | Colgan .......................... 717/104 |
| 6,407,753 | B1 | | 6/2002 | Budinsky |
| 6,643,668 | B2 | * | 11/2003 | Sluiman ......................... 717/104 |
| 6,651,240 | B1 | | 11/2003 | Yamamoto |
| 6,904,588 | B2 | * | 6/2005 | Reddy et al. ................... 717/104 |
| 6,996,799 | B1 | | 2/2006 | Cismas |

(Continued)

FOREIGN PATENT DOCUMENTS

EP 1 081 610 A2 3/2001

OTHER PUBLICATIONS

Gal et al., "A framework for modeling and evaluating automatic semantic reconciliation"; Springer Verlag, Dec. 2003, 18pg.*

(Continued)

*Primary Examiner* — Li Zhen
*Assistant Examiner* — Ryan Coyer
(74) *Attorney, Agent, or Firm* — Anthony V. S. England; William Steinberg

(57) ABSTRACT

Initial source and target models are divided into segments responsive to at least one segmentation rule. After changes, post-change source and target models are likewise divided. The at least one segmentation rule is defined responsive to at least one transformation rule such that use of the at least one segmentation rule divides initial source and target models into corresponding segments. Change statuses are identified regarding initial segments relative to post-change segments of the respective models responsive to comparing initial segments to post-change segments of the source model and initial segments to post-change segments of the target model. An indication of conflicts between the post-change source model and post-change target model is generated for presentation to a user or to a computer automated conflict settlement process. The generating is responsive to comparing the identified change statuses of the corresponding segments of the initial source model and initial target model.

20 Claims, 14 Drawing Sheets

U.S. PATENT DOCUMENTS

2005/0261787 A1* 11/2005 Plante .............................. 700/30
2007/0112878 A1* 5/2007 Bennett et al. ................ 707/201

OTHER PUBLICATIONS

Johann et al., "Instant and Incremental Transformations of Models"; IEEE, Sep. 2004; 4pg.*

Sendall et al., "Taming Model Round-Trip Engineering"; Workshop on Best Practices for Model-Driven Software Development; 2004; 13pg.*

Spanoudakis et al., "Reconciliation: Managing Interference in Software Development"; ECAI, 1996; 10pg.*

Spanoudakis et al., "Supporting the reconciliation of models of object behavior"; Springer Verlag, Apr. 2004; 20pg.*

Straw et al., "Model Composition Directives"; Springer-Verlag, 2004; 14pg.*

Ash et al., "Using Software Maintainability Models to Track Code Health"; IEEE, 1994; 7pg.*

* cited by examiner

```
Main (in models, out modelt){
    i= models. Start.out.target;
    modelt = new(Sequence);
    Transform (i, modelt);
}

Transform (in/out i, in/out s){
    Switch i:{
        case End: return;
        case Activity: {
            Transform_Activity: (i, s).
            Transform (i, s);
        }
        case Choice: {
            Transform_Choice(i, s);
        }
    }
}
```

```
Transform_Activity (in/out pointer, in/out s){
    tsk = new (Task, pointer);
    s.add(tsk);
    pointer = pointer.out.target;
}

Transform_Choice (in/out i, in/out s){
    swt = new(Switch);
    c1 = new(Case);      c2 = new(Case);
    swt.add(c1);         swt.add(c2);
    for counter = 1 to 2 {
        pointer = i.out_conn(counter).target,
        seq = new(Sequence);
        Transform(pointer, seq);
        swt.case[counter-1].add(seq);
    }
    s.add(swt);
}
```

FIG. 4

METHOD AND SYSTEM FOR ANALYZING AND PRESENTING CONFLICTS IN MODEL TRANSFORMATION AND AUTOMATICALLY RECONCILING MODEL TRANSFORMATION

TECHNICAL FIELD

The invention generally relates to model transformation, and particularly, relates to analyzing and presenting conflicts between source model changes and target model changes during model transformation, and further, relates to an automatically reconciling model transformation.

BACKGROUND OF THE INVENTION

In object-oriented technique field, Unified Modeling technique is one of the most important techniques currently in use. In 1997, Object Management Group (OMG) issued Unified Modeling Language (UML). UML is a modeling language having various functions and is well defined, easy to express, and widely used. Not only does it support object-oriented analysis and design, but also, and more importantly, it supports the whole procedure of software development beginning from demand analysis. One object of UML is to provide a development team with a universal design language to develop and construct computer applications. UML offers a set of unified standard modeling symbols, so that IT professionals can perform the modeling of computer applications. Using UML, the professionals can read and discuss system architectures and design layouts, like construction layouts used by architects for many years.

One reason that UML has become a "standard" for modeling language is that it is independent of program design language. Moreover, the UML symbol set is only a kind of language rather than methodology. This is critical, since a language differs from a methodology in that a language can easily fit some business operation of any company without any alteration. UML offers various types of model description figures. When these figures are used in a certain methodology, it makes the application program in development more easily understood. By representing a project with standard UML figures, a person skilled with UML may more easily understand the project and get in character. The common-used UML figures comprise: instance figure, class figure, sequence figure, status figure, activity figure, component figure, layout figure, and etc.

Taking the above as an example, high level models are transformed to low level models after their construction. Such a situation exists in the development process for various model-driven solutions. Then, the solution developer may change the transformed low level model by way of refinement, enhancement, optimization, and implementation. However, such changes in low level models usually cannot be reflected to high level models for the following reasons:

1) High level models and low level models are at different abstraction levels, so some low level changes are too trivial to be reflected to high level models.

2) For complex and large scale solution development, multiple solution developers are involved and the person taking charge of high level models is usually not those taking charge of low level models. Therefore, the latter might not communicate with the former about the changes to low level models.

3) Even if the above reason 2) is well-solved, reverse transformation of the changed low level models is needed. However, the reverse transformation is very difficult if not impossible.

Thus, it is seen from the above, there is a gap between the original high level models and the post-change low level models, i.e., low level models that have been changed after being created from original, high level models. Furthermore, with a change in requirements, original high level models have to be changed. Accordingly transformation should be done again to reflect the new changes to low level models.

The above description will be much clearer by referring to FIG. 1, for example. FIG. 1 illustrates the technical problem to be solved, wherein, s0 represents an original high level model (i.e., pre-change high level model), t0 represents the low level model transformed from s0 (i.e., pre-change low level model), s1 represents the post-change high level model by changing s0 according to requirements, t1 represents the post-change low level model by changing t0, and t2 represents the low level model newly generated by transforming s1 while including necessary changes in t1. It can be clearly seen, how to take the existing post-change low level model t1 into consideration while transforming s1, i.e., how to present conflicts between the changes in s1 and t1 and reconcile the changes in s1 and t1 to generate the new model t2, is a big challenge, in which the main difficulties are:

1) How to judge whether the changes on high level models conflict with those existing in the low level models?

2) How to implement the compatible changes on low level models in the newly generated low level models in retransformation?

Presently, solution developers can solve these problems manually. They retransform the post-change high level model s1 to a totally new low level model t2, compare the generated low level model t2 with the post-change low level model t1 to find conflicts and identify reusable model segments, and have the changes from t0 to t1 reflect manually to t2 to eliminate the conflicts. However, this manual method has the following two obvious disadvantages:

1) The manual method requires a lot of effort and time to analyze conflicts and copy compatible changes from a post-change low level model t1 to a newly generated low level model t2.

2) Veracity and consistency of manual conflict analysis is uncertain because it mainly relies on the solution developer himself, rather than the conflict in the model transformation itself.

Therefore, it is critical to provide a method and system for analyzing and presenting conflict in the model transformation and automatically reconciling model transformation, which reduces the efforts and difficulties to adjust solution for changing requirements, saves the cost and time brought by model-driven solution development method, and improves solution quality and stability.

For complying with well-known transformation related terms, the following uses the term 'source model' to denote a 'high level model', and the term 'target model' to denote a 'low level model'.

Although currently there is no method or system to support automatically reconciling model transformation, some related techniques exist, including but not limited to: 1) round trip engineering in Rational Software Architect (RSA); 2) model-code synchronization in Eclipse Modeling Framework (EMF); and 3) incremental transformation. The techniques listed above will be compared and explained item by item below.

For round trip engineering in RSA, a UML model is originally automatically transformed into code and Global Unique Identification (GUID), a unique identification code created for a certain entity, such as a document, through a particular algorithm) of model element is written in the special comment of its corresponding code element to indicate the tracing relationship between them. In this way, changes in the UML model can be automatically reflected to its corresponding code and vice versa. This approach, however, is hard to apply to reconcilable model transformation, because using a GUID to indicate a tracing relationship is not powerful enough to support complex transformation wherein multiple source elements are transformed to multiple target elements.

EMF allows users to select whether to protect some existing code from being overwritten when regenerating a changed Ecore model to code. But to do this users must judge in advance which part of the code is not conflict with the changed Ecore model.

3. Details on incremental transformation can be obtained from "Instant and Incremental Transformation of Models" (Proceedings of the 19th IEEE ICASE, Linz, Austria, Sep. 2004) by Sven Johann, Alexander Egyed. The above article addresses incremental model transformation from source model to target model, wherein only changed source model elements are re-transformed and merged to a previous target model so as to save effort. However, this approach doesn't consider a situation in which a previous target model might be changed before re-transformation.

SUMMARY OF THE INVENTION

The foregoing needs are addressed by a method for reconciling computer application model conflicts, wherein the computer application models include i) an initial source computer application model, ii) an initial target computer application model generated by applying at least one transformation rule to the initial source computer application model, iii) a post-change target model produced by at least one change to the initial target model, and iv) a post-change source model produced by at least one change to the initial source model. The method includes dividing the initial source and target models and the post-change source and target models into segments responsive to at least one segmentation rule. The at least one segmentation rule is defined responsive to the at least one transformation rule such that use of the at least one segmentation rule divides the initial source and target models into corresponding segments. The method includes identifying change statuses of the initial segments relative to the post-change segments of the respective models responsive to comparing initial segments to post-change segments of the source model and initial segments to post-change segments of the target model. The method also includes generating an indication of conflicts between the post-change source model and post-change target model for presentation to a user or to a computer automated conflict settlement process. The generating is responsive to comparing the identified change statuses of the corresponding segments of the initial source model and initial target model.

In another aspect, the method includes identifying, for the respective source and target models, correspondence among the initial and post-change segments.

In another aspect, the post-change segments include segments added by the at least one change to the respective initial models.

In another aspect, the identifying includes identifying change statuses for each pre-change segment relative to any corresponding existing or deleted post-change segment of the respective models.

In another aspect, the dividing is further responsive to at least one segment-relating rule.

In another aspect, the comparing of segments is responsive to predetermined segment comparison criteria, the criteria depending upon types of source and target segments and upon major and minor properties, and wherein the change statuses are selected from among statuses indicating that compared segments are: same, slightly different, and totally different.

In another aspect, the method includes creating a reconciled target model responsive to pre-defined reconciliation rules. The reconciled target model has segments and the creating of the reconciled target model includes selecting each segment of the reconciled target model from a segment of the post-change target model, a modified segment of the post-change target model, and a transformed segment of the post-change source model.

According to another form of the invention, a computer program product concerns reconciling computer application model conflicts. The computer program product has instructions stored on a tangible, computer-readable medium for execution by the computer to perform method steps such as described above.

According to another form of the invention, a computer system includes a processor and a storage device connected to the processor. The storage device has stored thereon a computer application model conflict reconciling program for controlling the processor to perform method steps such as described above.

Other variations, objects, advantages, and forms of the invention will become apparent upon reading the following detailed description and upon reference to the accompanying drawings.

BRIEF DESCRIPTION OF THE DRAWINGS

The novel features believed characters of the invention are set forth in the appended claims. However, the invention itself and its preferred mode, together with other objects and advantages, will be best appreciated from the reading of the following detailed description of the illustrative examples taken in conjunction with the drawings, in which:

FIG. 4 illustrates a transformation (TR), according to an embodiment of the invention, wherein the TR transforms the source segments in the source model into the target segments in the target model based on different elementary concepts;

Note that the same reference number designates the same or like components or units throughout the drawings.

DETAILED DESCRIPTION OF THE EMBODIMENTS

Figure 2:
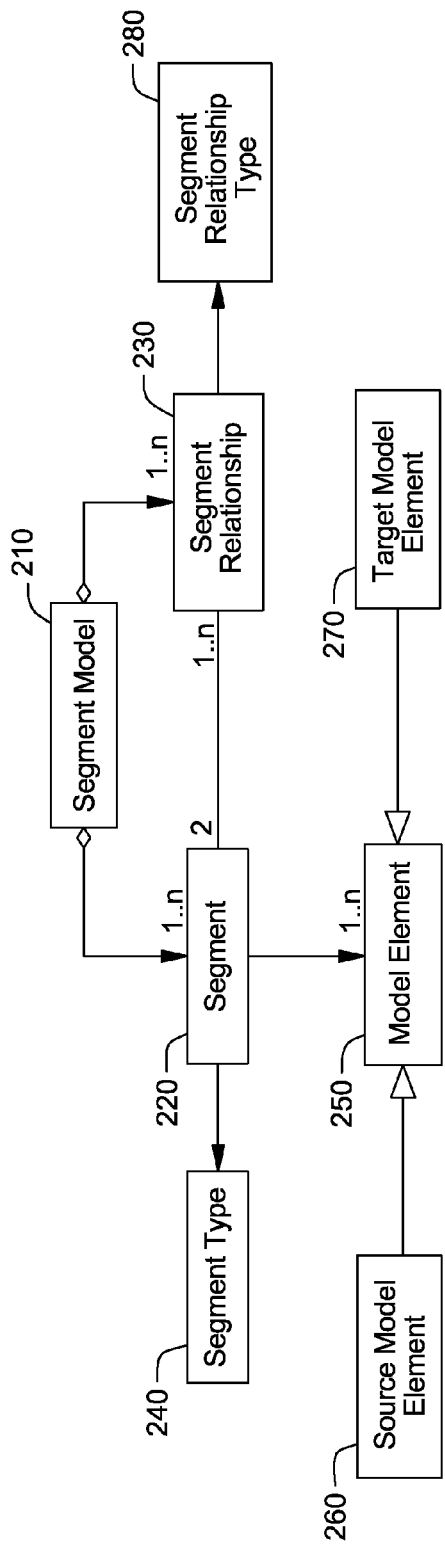
FIG. 2 illustrates the meta-model of the segment model, according to an embodiment of the invention.

An important feature of this invention is its unique segment based approach for analyzing and presenting conflicts and reusing previous compatible changes. A model segment is a subset of a model's element set, which is accepted by a model transformation rule instance as its valid source or target. Namely, the model segment in this invention appears in model transformation as a to-be transformed unit or a transformation result unit. If a model segment acts as the source of a model transformation rule instance, it is called a source model segment, or source segment. Similarly, if it acts as the target of a model transformation rule instance, it is called a target model segment, or target segment. Segments of a model, semantics of each segment and the relationship between segments compose a segment model, whose metamodel is shown in FIG. 2 according to an embodiment of the invention. In FIG. 2, a segment model 210 may comprise 1 ... n segments 220 and 1 ... n segment relationships 230. Each segment 220 may have a corresponding segment type 240. Additionally, each segment 220 may have 1 ... n model elements 250. The model element 250 may comprise source model element 260 and target model element 270. Similarly, the segment relationship 230 may have a segment relationship type 280. There may be 1 ... n segment relationships 230 between at least two segments 220. Based on specific model transformation rules, it's not hard to determine the corresponding segment types and segment relationship types that are shared by both the source segment and the target segment. Also it is possible to build the rules for dividing source and/or target model into segments based on specific model transformation rules.

Figure 3:
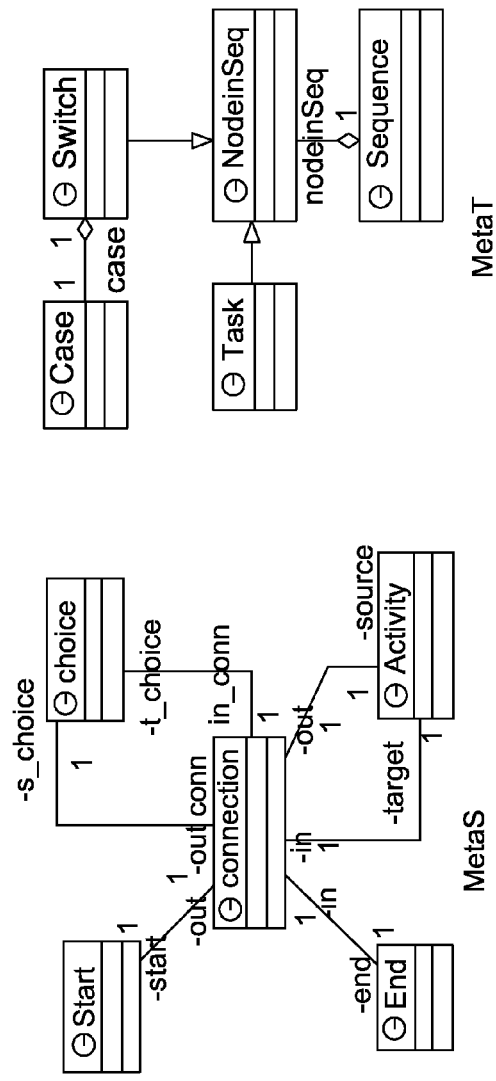
FIG. 3 illustrates two functional models MetaS and MetaT, according to an embodiment of the invention, wherein MetaS defines a simplified flow-style process model, and MetaT defines a simplified structural-style process model.

In an exemplary embodiment, two functional models are constructed: MetaS and MetaT, as shown in FIG. 3, according to an embodiment of the invention, wherein MetaS defines a simplified flow-style process model, and MetaT defines a simplified structural-style process model. Despite the simplification, MetaS and MetaT are still meaningful since they both support the elementary concepts in real modeling process, such as activity, sequence, choice, and etc. In FIG. 3, Number 1 and 2 represent the number of interfaces required between two nodes, and "in" and "out" represents input interface and output interface, respectively. For example, there are two "out_conn" interfaces from the Connection node to the Choice node representing the process branches. The two "out_conn" interfaces reach the Choice node via an s_choice interface at the Choice node, and after condition selection, the result returns to an in_conn interface at the Connection node via a t_choice interface at the Choice node. An ordinary technician in the related art can easily understand the description of other nodes and interfaces referring to the above contents, and thus it is not described herein in detail.

Figure 5:
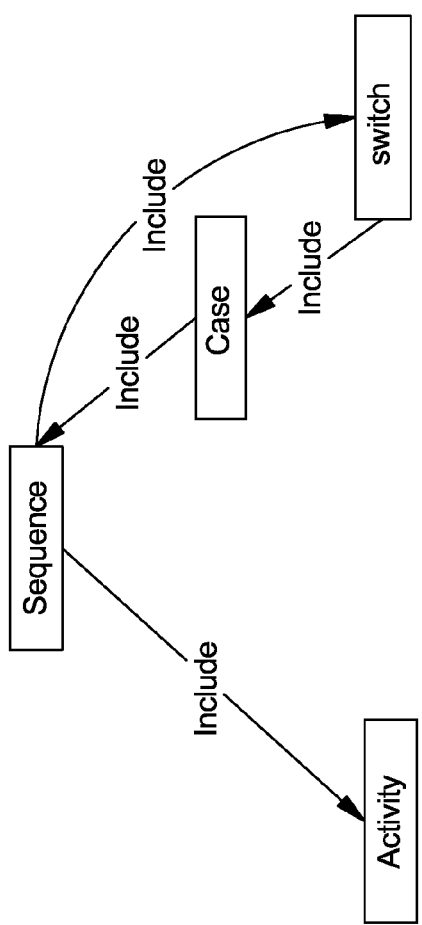
FIG. 5 illustrates the relations and the Include relationship between the nodes of MetaS and MetaT obtained in the context of TR, according to an embodiment of the invention.

Moreover, it is needed to build a specific transformation (TR) from source model (source segment) to target model (target segment), as shown in FIG. 4. FIG. 4 illustrates a transformation (TR) according to an embodiment of the invention, wherein the TR transforms the source segments in the source model into the target segments in the target model based on different nodes corresponding to the source segments and target segments respectively. For example, an Activity node in MetaS may be transformed to a Task node in MetaT, a Choice node in MetaS may be transformed to a Switch node in MetaT, and so on. Thus, as shown in FIG. 5, the relations and the Include relationship between the nodes of MetaS and MetaT obtained in the context of TR according to an embodiment of the invention are illustrated. The nodes pointed by the arrows in FIG. 5 represent the "Included by" relationship.

Figure 1:
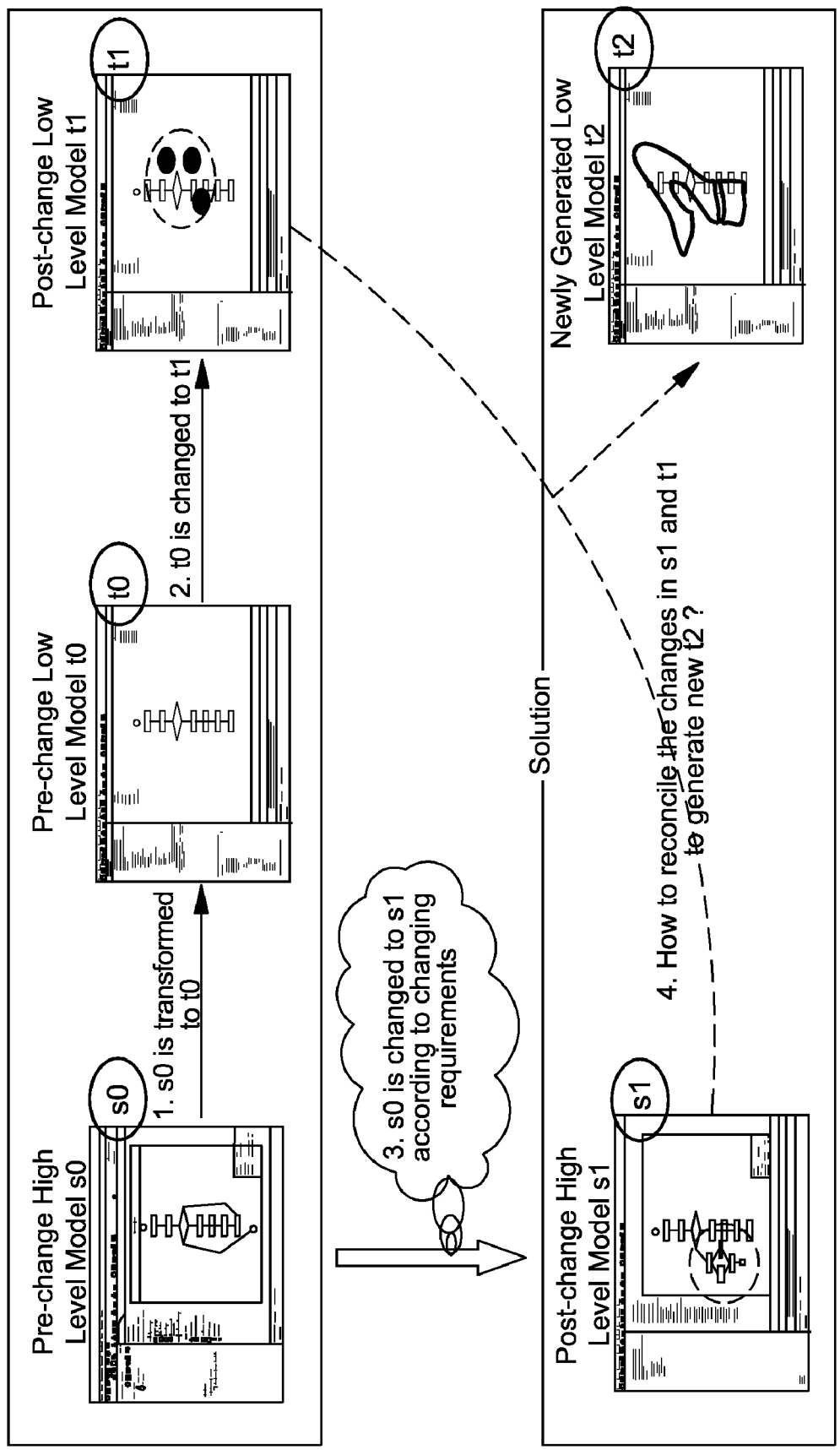
FIG. 1 is an illustration of the technical problem to be solved.
Figure 6:
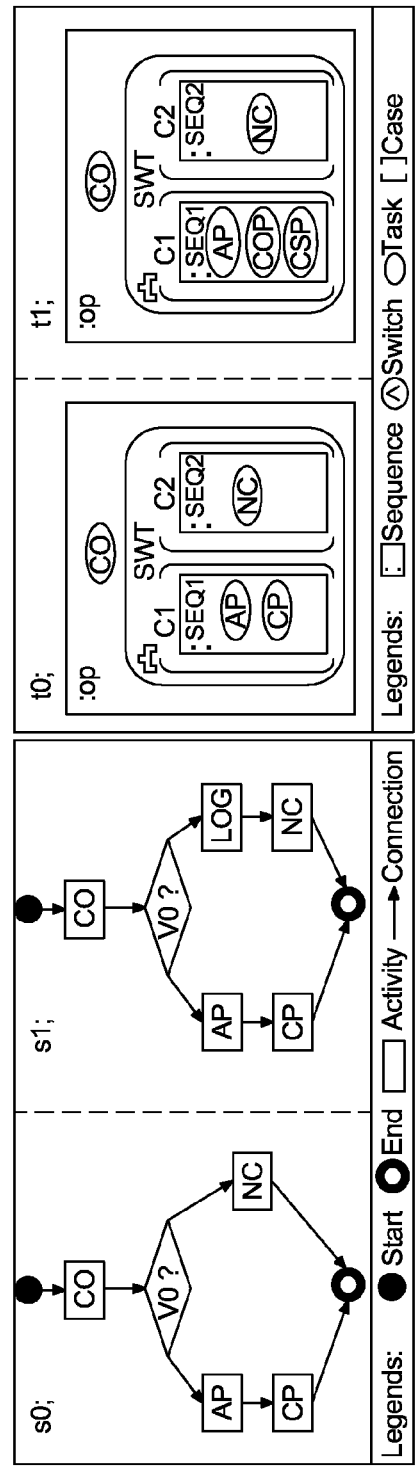
FIG. 6 is simplified schematic drawings of the pre-change source model s0, the post-change source model s1, the pre-change target model t0, and the post-change target model t1.

Before describing the preferred implementation of the invention in detail, source model and target model examples are set forth initially to facilitate those ordinary skilled in the art in better understanding the invention. Said examples refer to the pre-change source model s0, the pre-change target model t0 transformed from s0, the post-change source model s1 changed from s0 according to requirements, and the post-change target model t1 finally changed from t0, as described in FIG. 1. Said changes comprise: adding element, deleting element, combining element, dividing element, modifying element property, and etc. Note that one or more elements is denoted, regardless of the specific number of the elements mentioned in the description, unless explicitly defined otherwise.

s0, s1, t0 and t1 will be better understood by referring to FIG. 6. FIG. 6 illustrates simplified schematic drawings of s0, s1, t0 and t1. In the exemplary embodiment, s0 is constructed according to said MetaS described in FIG. 3 to describe simplified steps in an illustrated Order Processing operation that includes: checking validity of a received order (CO) to determine whether the order is valid (VO); if it is valid, arranging production according to the demand of the order (AP) and calculating the total price (CP); else notifying the customer of order invalidity (NC).

Then, s0 is transformed by TR to t0. t0 is constructed according to said MetaT described in FIG. 3. (The specific transformation procedure may be some well-known, i.e., prior art, procedure. Consequently, details thereof are herein omitted.) Note that when the source model is transformed to the target model, its segment names (such as CO, VO, AP, and etc) won't change.

In order to illustrate a realistic environment in which s0 is changed due to changing requirements, s0 is changed to s1 in the illustrated instance by adding logging (LOG) step before notifying customer (NC) in s0. Likewise, in order to illustrate a realistic environment in which t0 is changed according to refinement and concretization in the illustrated instance, Task 'Calculate Price (CP)' in t0 is split into two tasks: 'Calculate Goods Price (CGP)' and 'Calculate Shipping Price (CSP)', and its implementation is added to t0, and then to is changed to t1. Note that only simplest change of s0 and t0 is illustrated here for simplicity. However, any complicated changes and combinations are possible in actual implementation.

Through the accompanying drawings and the following detailed description and exemplary illustration of the above pre-change source model s0, pre-change target model t0, post-change source model s1, and post-change target model t1, those skilled in the art shall understand a method and system of the invention in which conflicts between source model changes and target model changes in model transformation are analyzed and presented utilizing a segment-based approach.

Figure 7:
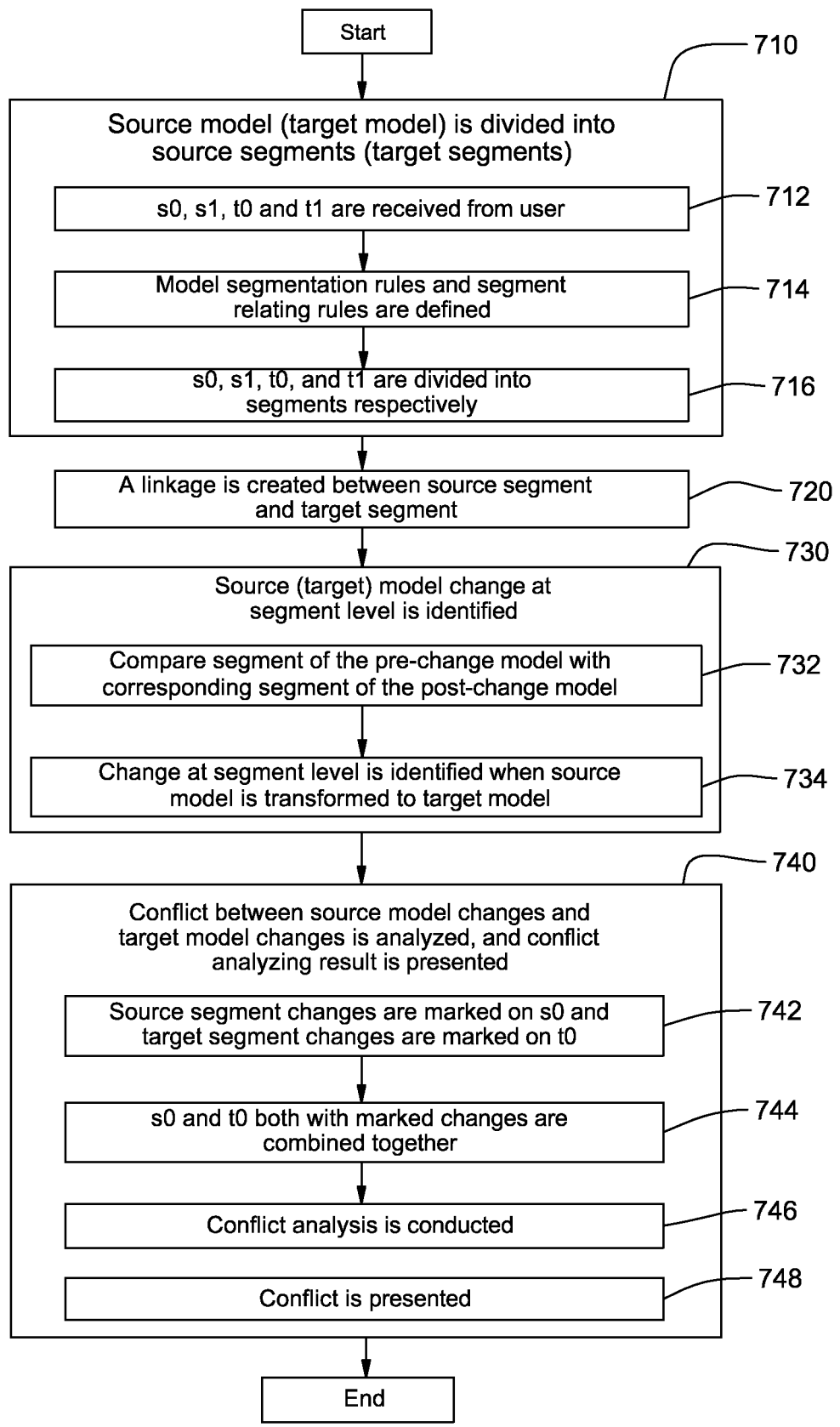
FIG. 7 is a flow chart illustrating a method for analyzing and presenting the conflicts between source model changes and target model changes in model transformation, according to an embodiment of the invention.

Now referring to FIG. 7, a flow chart illustrates a method for analyzing and presenting conflicts between source model changes and target model changes in model transformation, according to an embodiment of the invention. As shown in FIG. 7, initially at step 710, the source model and the target model are divided into source segments and target segments respectively, wherein the source segments and target segments compose a subset of the model element set, and can be accepted by a model transformation rule instance as its valid source or target. That is, a model segment appears in the invention as a to-be transformed unit or a transformation result unit in model transformation. More specifically, the step may comply with the following detailed process.

Firstly, at step 712, the pre-change source model s0, the post-change source model s1, the pre-change target model t0, and the post-change target model t1 are received from a user as the system input.

Then, at step 714, a set of model segmentation rules and segment relating rules are defined according to the transformation (TR) from source model to target model. In fact, the segmentation rules can be regarded as the queries on models represented by meta model elements. The step may be performed on the pre-change source model s0 and the pre-change target model t0 respectively, so as to obtain the model segmentation rules and the segment relating rules corresponding to s0 and t0, respectively.

The transformation (TR) rules are used for identifying each Activity node in the source model, and transforming the Activity node to a Task node in the target model. Thus, in this context an exemplary source segmentation rule may be defined:

Activity_Seg_S::={element|element∈source model ^ is TypeOf(element, 'Activity')}, and an exemplary target segmentation rule may be defined:

Task_Seg_T::={element|element∈target model ^ is TypeOf (element, 'Task')}.

Similarly, other segmentation rules can be defined. It is not possible to enumerate all possible such rules, since these rules are defined according to actual TRs. The segmentation rules further include but are not limited to: source segmentation rule Choice_Seg_S for Choice node and target segmentation rule Switch_Seg_T for Switch node; source/target segmentation rule Sequence_Seg_S and Sequence_Seg_T for Sequence node; and source segmentation rule Branch_Seg_S for Branch node and target segmentation rule Case_Seg_T for Case node. In an alternative embodiment, these segmentation rules can be modified, added, and deleted manually.

Moreover, given arbitrary segments seg1 and seg2, an exemplary segment relating rule is:

Include_Rel (seg1, seg2)::=seg1 ⊂ seg2, which denotes that the given segment seg1 is included by the given segment seg2.

Then at step 716, the whole source model s0 and target model t0 are traversed by applying the above segmentation rules and segment relating rules, and the input pre-change source model s0 and the pre-change target model t0 are divided into segment models. Thus, the pre-change source model s0 and the pre-change target model t0 could be considered as segment lists, respectively. For example, applying Activity_Seg_S to s0 will generate four Activity segments: {'CO': Activity}, {'AP': Activity}, {'CP': Activity}, and {'NC': Activity}, and applying Task_Seg_T to t0 will generate four Task segments: {'CO': Task}, {'AP': Task}, {'CP': Task}, and {'NC': Task}.

Figure 8:
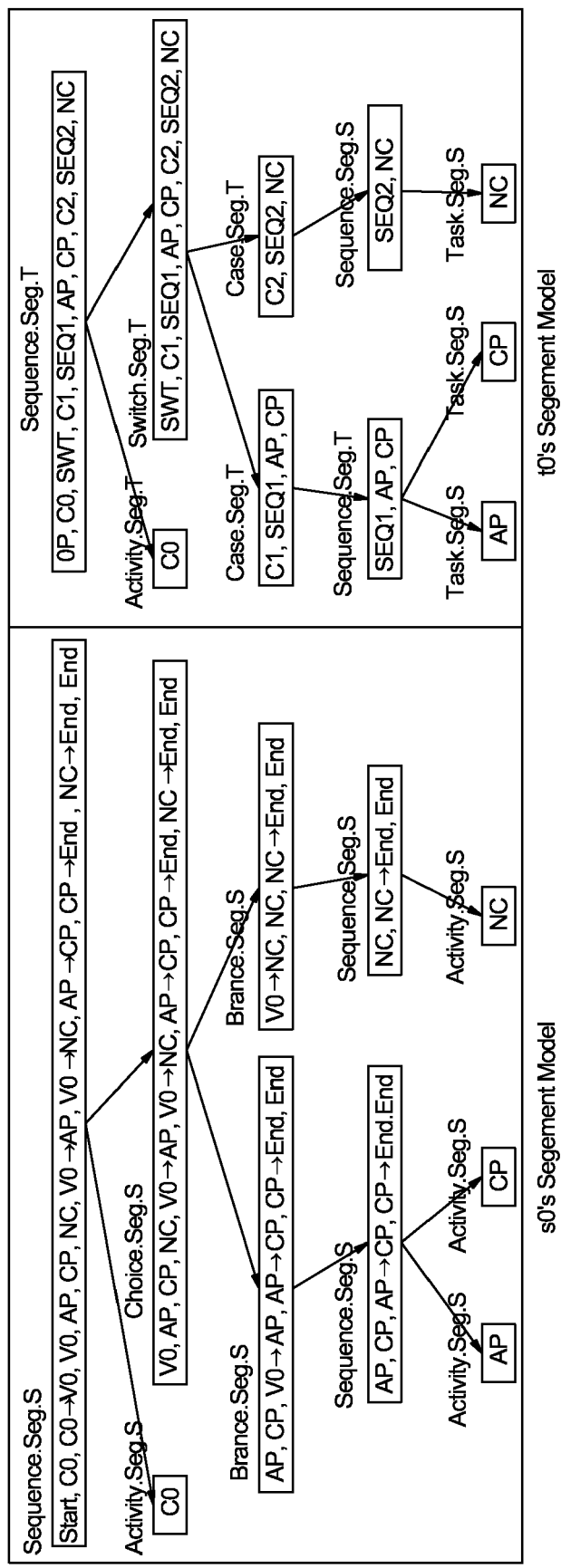
FIG. 8 illustrates a source segment model, a target segment model, and relationships thereof, according to an embodiment of the invention.

By applying appropriate source segmentation rules to s0 and applying appropriate target segmentation rules to t0, the source segment model SegMdl_S and the target segment model SegMdl_T can be obtained, as shown in FIG. 8. FIG. 8 illustrates the source segment model SegMdl_S, the target segment model SegMdl_T, and the relationship thereof. In FIG. 8, the left box denotes the source segment model SegMdl_S, and the right box denotes the target segment model SegMdl_T. Each straightaway arrow from one segment to another segment denotes the Include relationship between those two segments, and the segment pointed to by the arrow denotes the segment to be included. The execution result of step 710 can be clearly seen from FIG. 8: the source segment model and the target segment model including several segments and the relationship thereof, structures and semantics.

According to the above step 716 and based on the segment lists through dividing the pre-change source model s0 and the pre-change target model t0, the post-change source model s1 and the post-change target model t1 are similarly traversed and divided, so as to obtain the segment models for s1 and t1.

Then at step 720, a linkage is created between a source segment and a target segment. Specifically, the linkage between a source segment and a target segment is created according to the transformation TR, which is one-to-one related. For example, the transformation TR translates each 'Activity' node in the source model s0 to a 'Task' node in the target model t0 with the same name. Thereby, it is possible to determine that a transformation linkage exists between a source segment seg_s with applying the rule of 'Activity_Seg_S' and a target segment seg_t with applying the rule of 'Task_Seg T', and the criterion for judging the existence of the linkage are as below:

ExistLinkage(seg_s, seg_t)::=(e1.name==e2.name), e1∈seg_s, e2∈seg_t.

That is, only if the name of the source segment seg_s is the same as that of the target segment seg_t, the linkage can be judged to exist.

Similarly, other transformation TR related linkage existence decision criteria can be defined, including, but not limited to, the linkage existence decision criterion for a source segment with applying the rule of 'Branch_Seg_S' and a target segment with applying the rule of 'Case_Seg T', the linkage existence decision criterion for a source segment with applying the rule of 'Choice_Seg_S' and a target segment with applying the rule of 'Switch_Seg_T', and the linkage existence decision criterion for a source segment with applying the rule of 'Sequence_Seg_S' and a target segment with applying the rule of 'Sequence_Seg_T'.

Through respectively applying the above linkage existence decision criteria to the segments corresponding to s0 and t0, those skilled in the art can appreciate that the source segment model SegMdl_S and the target segment model SegMdl_T become isomorphic. The characteristic is very important for identifying the change at the source segment side and the change at the target segment side, and merging both of them to one base to identify the conflicts between them. The characteristic can be described in Table 1 as below:

TABLE 1

(seg_s ∈ SegMdl_S -> ∃ seg_t ∈ SegMdl_T, ExistLinkage(seg_s, seg_t))
^(seg_t ∈ SegMdl_T -> ∃ seg_s ∈ SegMdl_S, ExistLinkage(seg_s, seg_t))
^((seg0_s, seg1_s) ∈ SegMdl_S -> ∃ seg0_t ∈ SegMdl_T, ∃ seg1_t ∈ SegMdl_T, ExistLinkage(seg0_s, seg0_t) ^ ExistLinkage(seg1_s, seg1_t) ^ (seg0_t, seg1_t) ∈ SegMdl_T )
^((seg0_t, seg1_t) ∈ SegMdl_T -> ∃ seg0_s ∈ SegMdl_S, ∃ seg1_s ∈ SegMdl_S, ExistLinkage(seg0_s, seg0_t) ^ ExistLinkage(seg1_s, seg1_t) ^ (seg0_s, seg1_s) ∈ SegMdl_S )

As shown in Table 1, the characteristic can be described as: given seg_s in the source segment model SegMdl_S, there is seg_t in the target segment model SegMdl_T, and there is a linkage between seg_s and seg_t; or given seg_t in the target segment model SegMdl_T, there is seg_s in the source segment model SegMdl_S, and there is a linkage between seg_s and seg_t; or given seg0_s and seg1_s in the source segment model SegMdl_S, there are seg0_t and seg1_t in the target segment model SegMdl_T, and there is a linkage between seg0_s and seg0_t or between seg1_s and seg1_t; or given seg0_t and seg1_t in the target segment model SegMdl_T, there are seg0_s and seg1_s in the source segment model SegMdl_S, and there is a linkage between seg0_s and seg0_t or between seg1_s and seg1_t.

Then, at step 730, the source model change or the target model change at segment level are identified. That is, each change between the pre-change source model s0 and the post-change source model s1 is identified along with its corresponding source segment. Likewise, each change between the pre-change target model t0 and the post-change target model t1 at segment level is identified along with its corresponding target segment. Specifically, this step may comply with the following detailed process.

First at step 732, it compares the segment of the pre-change model (such as s0 or t0) with the corresponding segment of the post-change model (such as s1 or t1), and checks whether they are the same (denoted as '='), or slightly different (denoted as '≈'), or totally different (denoted as '≠'). For example, given two arbitrary segments seg1 and seg2, the segment comparing criteria for comparing them are shown in Table 2 as below:

TABLE 2

| | | Segment Comparing Criteria | |
|---|---|---|---|
| Result | Type | Major Properties | Minor Properties |
| seg1 = seg2 | same | ∀ MajP, seg1.MajP = seg2.MajP | ∀MirP, seg1.MirP = seg2.MirP |
| seg1 ≈ seg2 | same | ∀ MajP, seg1.MajP = seg2.MajP | ∀MirP, seg1.MirP ≠ seg2.MirP |
| seg1 ≠ seg2 | same | ∃ MajP, seg1.MajP ≠ seg2.MajP | / |
| | different | / | / |

As shown in Table 2, if the two segments seg1 and seg2 are of the same type and all of their corresponding major properties and minor properties are identical, they are regarded as the same. If the two segments seg1 and seg2 are of the same type and all of their corresponding major properties are identical, but some of their corresponding minor properties aren't identical, they are regarded as slightly different. If the two segments seg1 and seg2 are of the same type and some of their corresponding major properties aren't identical, they are regarded as totally different. If the two segments seg1 and seg2 aren't of the same type, they are regarded as totally different. Here, the major properties of a segment refer to the basic description of the segment that can not be changed, such as the unique ID (UID), and the minor properties of a segment refer to the supplementary description and explanation, such as the segment name.

At step 732, comparison is made between s0 and s1 and between t0 and t1, and the respective comparison results are obtained.

After performing the above step 732 for comparison, then at step 734, the change at segment level is identified when the source model is transformed to the target model. The change at segment level is identified when a model is transformed to another model according to the comparison results based segment change identifying criteria. Given a model M that is changed to M', the segment change identifying criteria for identifying the changes at segment level are shown in Table 3 as below, in which seg and seg' correspond to the segments of the model M and M' respectively:

TABLE 3

| Result | Segment Change Identifying Criteria |
|---|---|
| seg is not changed | seg ∈ SegMdl_M ∧ (∃ seg' ∈ SegMdl_M', seg = seg') |
| seg' is added | seg' ∈ SegMdl_M' ∧ (∀ seg ∈ SegMdl_M, !( seg' = seg \| seg' ≈ seg)) |
| seg is deleted | seg ∈ SegMdl_M ∧ (∀ seg' ∈ SegMdl_M', !( seg = seg' \| seg ≈ seg')) |
| seg is modified | seg ∈ SegMdl_M ∧ (∃ seg' ∈ SegMdl_M', seg ≈ seg') |

As shown in Table 3, for seg in M, if seg=seg', then seg is not changed; for seg' in M', if seg'=seg or seg'≈seg does not come to existence, then seg' is added; for seg in M, if seg=seg' or seg≈seg' does not come to existence, then seg is deleted; and for seg in M, if seg≈seg', then seg is modified.

For the modified segment, more details need to be captured to record the exact modified properties, which is crucial for more precise conflict analysis (to be described in detail hereinafter). If a sub-segment of some segment is identified as changed, for example, being added, modified or deleted, the segment is also identified as modified. In this example, for instance, the segment {'SEQ1': Sequence, 'AP': Activity, 'CP': Activity} is identified as modified since its sub-segment {'CP': Activity} is identified as deleted, wherein the deletion of the sub-segment CP is identified as the modification property of the segment SEQ1.

Then, at step 740, the conflicts between the source model changes and the target model changes are analyzed according to the linkage between the source segments and target segments and according to the changes at segment level identified at step 730, and the conflict analyzing result is presented. As the changes between the source models s0 and s1 and the changes between the target models t0 and t1 are made from individual's perspective without awareness of each other, it might cause conflict when reconciling those changes. Taking the previous example as the object for description, for instance, assume that the node in the source model {'CO': Activity} is transformed to the node in the target model {'CO':Task}. If the source model node at the source model's side {'CO':Activity} is deleted according to a requirement, but the target model node at the target model's side {'CO': Task} is modified to {'CCOO':Task}, it is obviously that they are conflictive since it's impossible to accept both when reconciling. Therefore, it is necessary to briefly analyze and present the conflicts between both. Specifically, the step may comply with the following detailed process.

First, at step 742, the source segment changes from s0 to s1 are marked on the pre-change source model s0, and the target segment changes from t0 to t1 are marked on the pre-change target model t0. The reason for selecting s0 and t0 as the base for marking changes is in that s0 and t0 are isomorphic, which is advantageous in analyzing and presenting the conflict afterwards.

Figure 9:
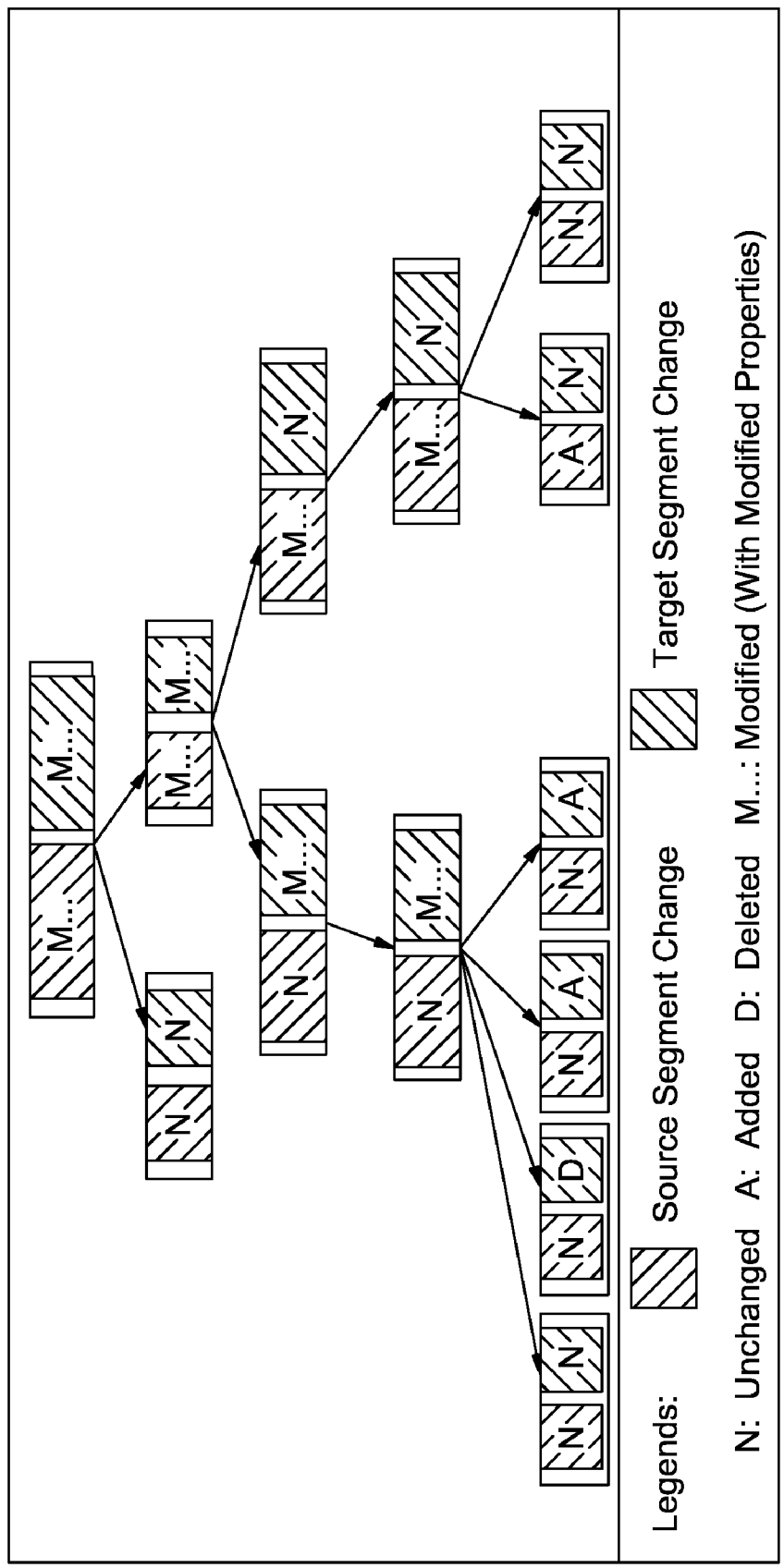
FIG. 9 illustrates a Unified Change Marking Graph (UCMG), according to an embodiment of the invention.

At step 744, the pre-change source model s0 and the pre-change target model t0 both with the marked changes are combined together. As described above, since the pre-change source model s0 and the pre-change target model t0 are isomorphic, the changes marked on both s0 and t0 can be merged to one same common base. In this embodiment, the common base may be so-called Unified Change Marking Graph (UCMG), as shown in FIG. 9. FIG. 9 illustrates a Unified Change Marking Graph (UCMG) according to an embodiment of the invention. In the UCMG of FIG. 9, the segment changes from s0 to s1 and the segment changes from t0 to t1 are marked on a common structure that is isomorphic to the segment model of s0 and t0. Each node in the common structure corresponds to two sub-nodes, wherein the left sub-node in each node denotes the source segment changes, and the right sub-node denotes the target segment changes. The letter in the left/right sub-node block denotes the identified source/target segment change results respectively. For example, N denotes "unchanged", A denotes "added", D denotes "deleted", and M denotes "modified", with modified properties.

At step 746, using the UCMG of FIG. 9, the conflict analysis is conducted through traversing the whole structure and checking the change marks on each node. For example, obviously, if the corresponding marks of a certain node's source segment and target segment are both "N" (unchanged) or both "D" (deleted), then the node is considered to have no conflict; otherwise the node is considered to have potential conflict. Supplemental conflict identifying criteria are further needed to be defined to clarify which situations are really conflictive and which are not. The conflict identifying criteria are shown in Table 4 as below:

TABLE 4

| Result | Conflict Identifying Criteria | |
|---|---|---|
| | Source Segment Change Mark | Target Segment Change Mark |
| Conflictive | N | A/D/M . . . |
| Conflictive | A/D/M . . . | N |
| Conflictive | M . . . | D |
| Conflictive | D | M . . . |

TABLE 4-continued

| Result | Conflict Identifying Criteria | |
|---|---|---|
| | Source Segment Change Mark | Target Segment Change Mark |
| Non-conflictive | M.sub_seg (Source)M.sub_seg ≠ | M.sub_seg (Target)M.sub_seg |
| . . . | . . . | . . . |

As shown in Table 4, for example, when the source segment change mark is "N", and the target segment change mark is another letter (such as "A", "D", or "M . . . "), the node is considered to have conflict; and when the source segment differs from the target segment, the node is considered to have no conflict. Those skilled in the art can similarly appreciate other conflict identifying criteria in Table 4. Note that those conflict identifying criteria in Table 4 are only for exemplary and enumerative purpose, and do not preclude additional criteria. To meet the requirements of different embodiments, it is possible to define more or less conflict identifying criteria or modify the conflict identifying criteria listed herein. By applying the above conflict identifying criteria to each node in the UCMG, it is possible to analyze whether there is any conflict between the source model changes and the target model changes on a certain node.

At step 748, the conflict at segment level is presented visually. This can be similarly reflected to the UCMG shown in FIG. 9. For example, the nodes with conflict and the nodes without conflict are marked with different colors or different sizes, or only the nodes with conflict are displayed to a user. Other manners for distinguishing them may occur to those ordinary skilled in the art.

With the visualized UCMG shown in FIG. 9, it is possible to analyze and present the conflicts between source model changes and target model changes in model transformation. Note that the above method embodiment is for illustrative purpose only, some steps may be added, deleted, combined, or divided into more steps without deviating from the essence of the invention. Additionally, in this embodiment, the conflict is presented using UCMG. However, other presenting manners (for example, a segment list in which source segment and target segment are one-to-one related) are possible to achieve the object of the invention and thus within the scope of the invention.

Alternatively, in other embodiments of the invention, the above method may further comprise the following step: establishing or adjusting by user manually said various rules and criteria, such as model segmentation rules, segment relating rules, linkage existence decision criteria, segment comparison criteria, segment change identifying criteria, conflict identifying criteria, and etc.

Figure 10:
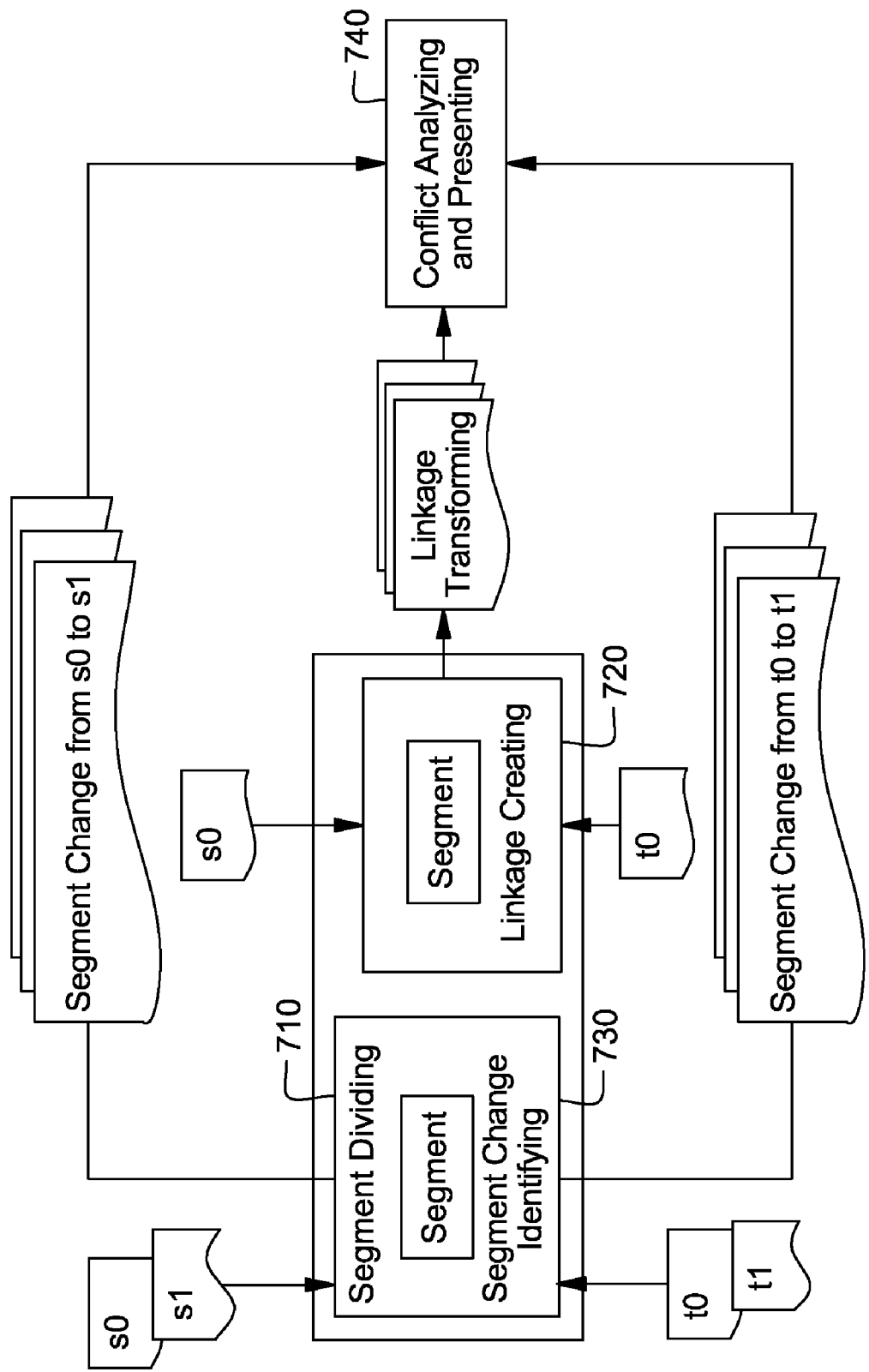
FIG. 10 illustrates the execution logic of a method for analyzing and presenting the conflicts between source model changes and target model changes in model transformation, according to an embodiment of the invention.

Now referring to FIG. 10, execution logic is illustrated for analyzing and presenting conflicts between source model changes and target model changes in model transformation, according to an embodiment of the invention. It can be seen from FIG. 10, the input s0, s1, t0 and t1 can be divided into segments respectively (710), and the segment changes are identified (730), linkages between s0 and t0 are created according to the actual transformation (720), and the conflicts are analyzed and presented based on the transformation linkages and the segment changes from s0 to s1 and the segment changes from t0 to t1 (740).

Under the same inventive concept, the invention proposes a system for analyzing and presenting the conflicts between source model changes and target model changes in model transformation. The system will be described hereinafter in detail in conjunction with drawings.

Figure 11:
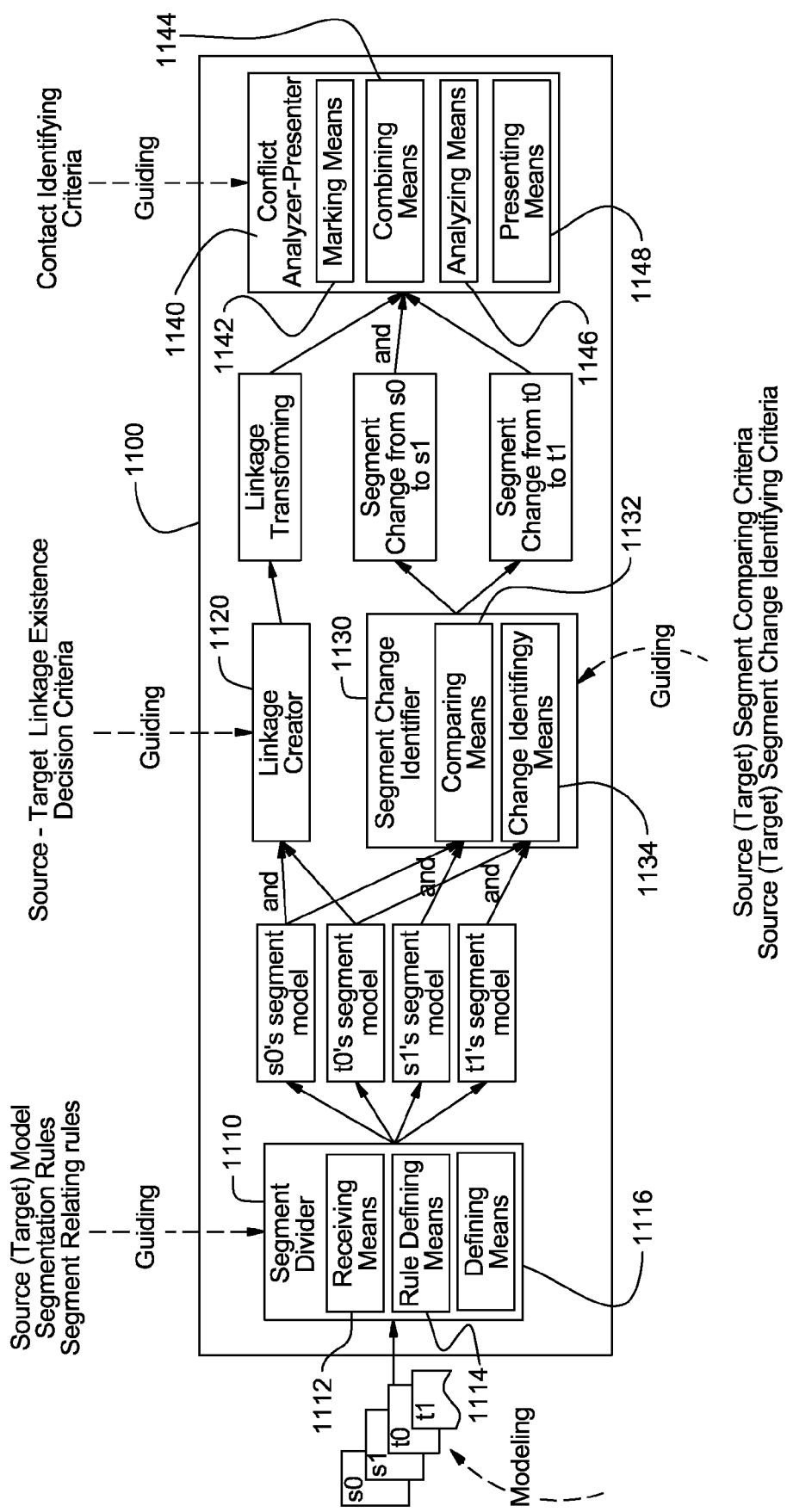
FIG. 11 illustrates a system for analyzing and presenting conflicts between source model changes and target model changes in model transformation, according to an embodiment of the invention.

FIG. 11 illustrates a system 1100 for analyzing and presenting the conflicts between source model changes and target model changes in model transformation according to the invention. As shown in FIG. 11, system 1100 comprises segment divider 1110, linkage creator 1120, segment change identifier 1130 and conflict analyzer-presenter 1140.

Segment divider 1110 divides source model and target model into source segments and target segments respectively, in which the source segment and the target segment is a subset of the model's element set and can be accepted by a model transformation rule instance as its valid source or target. That is, a model segment appears in the invention as a to-be transformed unit or a transformation result unit in model transformation. As shown in FIG. 11, segment divider 1110 further comprises receiving means 1112, rule defining means 1114, and dividing means 1116.

Receiving means 1112 receives as system input the pre-change source model s0, the post-change source model s1, the pre-change target model t0, and the post-change target model t1.

Rule defining means 1114 defines a set of model segmentation rules and segment relating rules according to the transformation (TR) from source model to target model. Rule defining means 1114 may operate on the pre-change source model s0 and the pre-change target model t0 respectively, so as to obtain the model segmentation rules and the segment relating rules corresponding to s0 and t0, respectively. The exemplary model segmentation rules and segment relating rules have been described above in detail, and thus are not unduly repeated herein.

Dividing means 1116 traverses the whole source model s0 and target model t0 by applying the above segmentation rules and segment relating rules, and divides the input pre-change source model s0 and the pre-change target model t0 into segment models. Thus, the pre-change source model s0 and the pre-change target model t0 could be considered as segment lists, respectively. Based on the segment lists through dividing the pre-change source model s0 and the pre-change target model t0, the post-change source model s1 and the post-change target model t1 are similarly traversed and divided, so as to obtain the segment models for s1 and t1.

Linkage creator 1120 creates a linkage between a source segment and a target segment. Specifically, linkage creator 1120 creates a linkage between a source segment and a target segment according to the transformation TR, which is one-to-one related. The linkage existence decision criteria have been described in detail by referring to Table 1, and thus are not unduly repeated herein.

Segment change identifier 1130 identifies the source model change or the target model change at segment level, i.e., the change between the pre-change source model s0 and the post-change source model s1 and the change between the pre-change target model t0 and the post-change target model t1 at segment level. Segment change identifier 1130 further comprises comparing means 1132 and change identifying means 1134.

Comparing means 1132 compares the segment of the pre-change source/target model (such s0/t0) with the corresponding segment of the post-change source/target model (such as s1/t1), and check whether they are the same (denoted as '='), or slightly different (denoted as '≈'), or totally different (denoted as '≠'). The segment comparing criteria have been described in detail by referring to Table 2, and thus are not unduly repeated herein.

Change identifying means 1134 identifies the change at segment level when the source model is transformed to the target model according to segment change identifying criteria. The segment change identifying criteria have been described in detail by referring to Table 3, and thus are not unduly repeated herein. For the modified segments, more details need to be captured to record the exact modified properties.

Conflict analyzer-presenter 1140 analyzes and presents the conflicts between source model changes and target model changes according to the linkage between the source segment and the target segment and according to the results identified at step 730. Conflict analyzer-presenter 1140 further comprises marking means 1142, combining means 1144, analyzing means 1146 and presenting means 1148.

Marking means 1142 marks the source segment changes from s0 to s1 on the pre-change source model s0, and marks the target segment changes from t0 to t1 on the pre-change target model t0.

Combining means 1144 combines the pre-change source model s0 and the pre-change target model t0 both with the marked changes together. As described above, since the pre-change source model s0 and the pre-change target model t0 are isomorphic, the changes marked on both s0 and t0 can be merged to a common base. In this embodiment, the common base may be so-called Unified Change Marking Graph (UCMG) (FIG. 9).

Analyzing means 1146, using the UCMG of FIG. 9, conducts the conflict analysis through traversing the whole structure and checking the change marks on each node. Supplemental conflict identifying criteria are further needed to be defined to clarify which situations are really conflictive and which are not. The conflict identifying criteria have been described in detail by referring to Table 4, and thus are not unduly repeated herein. By applying the above conflict identifying criteria to each node in the UCMG, it is possible to analyze whether there is any conflict between the source model changes and the target model changes on a certain node.

Presenting means 1148 presents visually the conflict at segment level. This can be similarly reflected to the UCMG shown in FIG. 9. For example, the nodes with conflict and the nodes without conflict are marked with different colors or different sizes, or only the nodes with conflict are displayed to a user. Other manners for distinguishing them may occur to those of ordinary skill in the art.

Alternatively, in other embodiments of the invention, the system 1100 may further comprise: storage, for storing the linkage between the source segment and the target segment and various rules and criteria, such as model segmentation rules, segment relating rules, linkage existence decision criteria, segment comparison criteria, segment change identifying criteria, conflict identifying criteria, and etc; and user interface, for user manually establishing or adjusting the various rules and criteria. Although these means are not clearly shown in the figure, those of ordinary skill in the art may understand that both the storage and the user interface are commonly known means in the art, and thus the detailed description thereof is omitted for simplicity.

A system of the invention for analyzing and presenting conflicts between source model changes and target model changes in model transformation is described above in detail. The system and various components thereof can be implemented with hardware, software, or the combination thereof, and can be combined with other systems upon needed.

After analyzing and presenting the conflicts between source model changes and target model changes in model transformation according to the method and system of the invention, there is still a need for automatically reconciling model transformation. Specifically, there is a need for automatically reconciling the transformation of the post-change source model s1, while taking the transformation of the post-change target model t1 into consideration, so as to generate a new target model t2. Therefore, the invention provides a method and system for automatically reconciling model transformation to solve the above-mentioned problem. Initially, a method for automatically reconciling model transformation is described in detail in conjunction with drawings.

Figure 12:
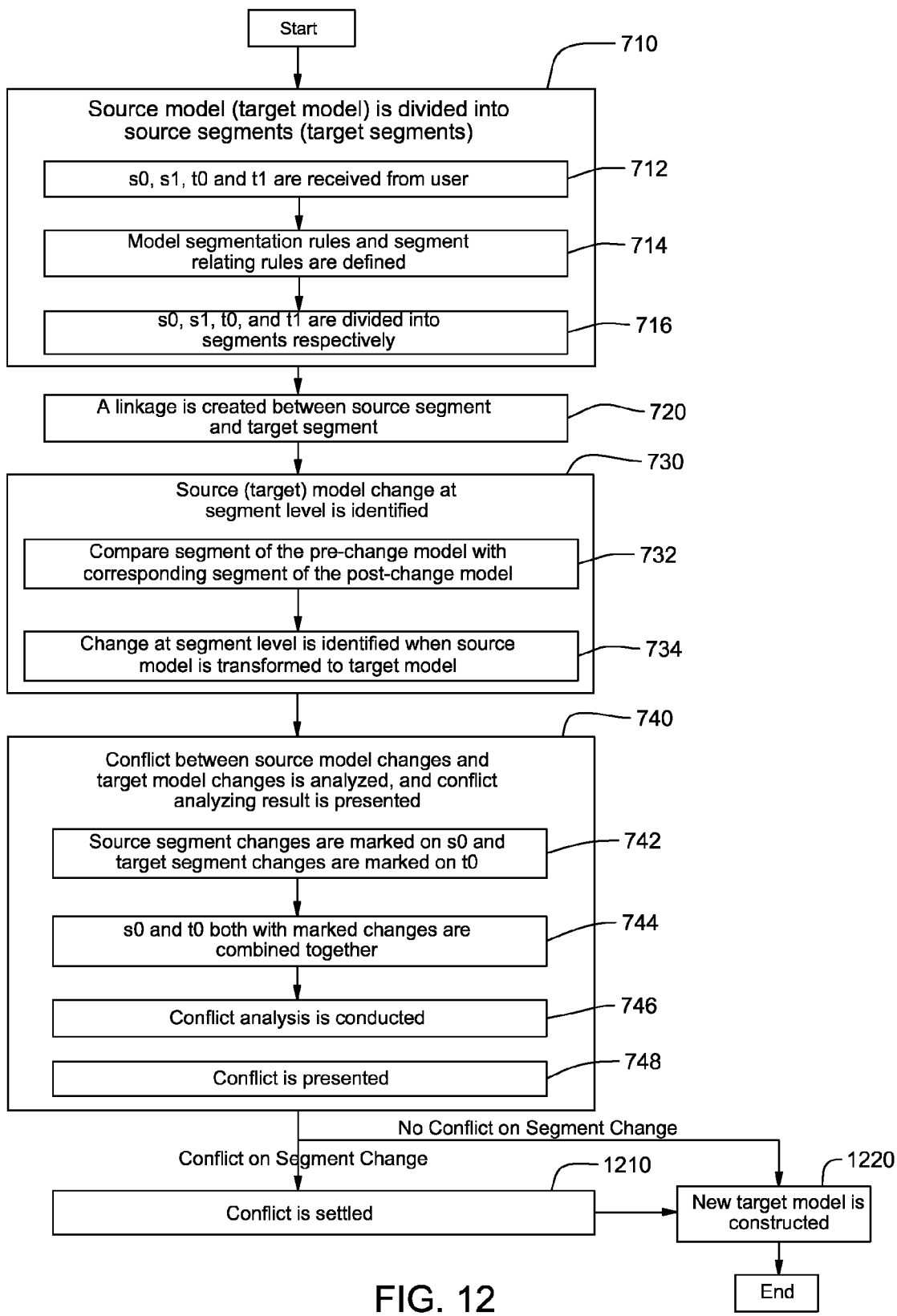
FIG. 12 is a flow chart illustrating a method for automatically reconciling model transformation, according to an embodiment of the invention.

Now referring to FIG. 12, a flow chart illustrates a method for automatically reconciling model transformation, according to an embodiment of the invention. As shown in FIG. 12, the illustrated method for automatically reconciling model transformation comprises the method for analyzing and presenting the conflicts between source model changes and target model changes in model transformation according to the invention (as shown in FIG. 7), and further comprises the following process.

The process proceeds to step 1210 when there are any conflicts according to the analyzing result of step 740 in FIG. 7. At step 1210, the conflicts between source model change and target model change are settled. These conflicts can be batch-processed according to pre-defined conflict settlement criteria, or processed by user manually node by node. To improve efficiency and enhance stability, pre-defined conflict settlement criteria are preferably provided. Exemplary conflict settlement criteria are shown in Table 5 as below:

TABLE 5

| Result | Conflict Settlement Criteria | |
| --- | --- | --- |
| | Source Segment Change Mark | Target Segment Change Mark |
| Keep target segment change | N | A/D/M ... |
| Keep source segment change | A/D/M ... | N |
| Keep target segment change | M ... | D |
| Keep source segment change | D | M ... |
| ... | ... | ... |

Note that those conflict settlement criteria in Table 5 are only for exemplary and enumerative purpose, and do not preclude additional criteria. To meet the requirements of different embodiments, it is possible to define more or less conflict settlement criteria or modify the conflict settlement criteria listed herein. By applying the above conflict settlement criteria to each node in the UCMG of FIG. 9 having conflict, conflicts (if they exist) may be settled between source segment and target segment on each node in the UCMG. In some embodiments, when there is a situation that the conflict settlement criteria do not address, user may handle the conflict on the node manually.

Figure 13:
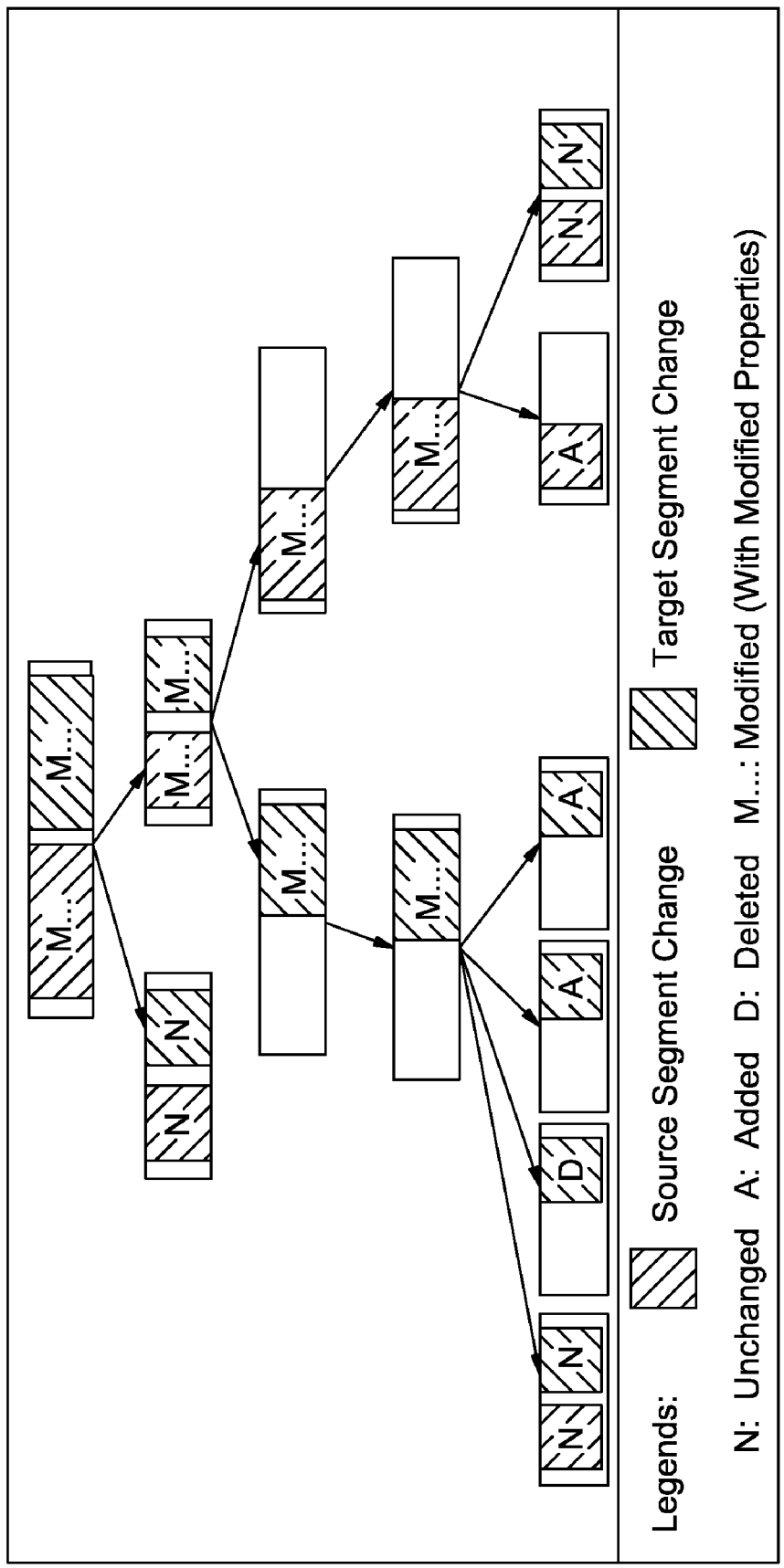
FIG. 13 illustrates an example of the post-settlement UCMG according to an embodiment of the invention, wherein each node incurring conflict is traversed, and updated as only having one effective result manually or according to the conflict settlement criteria.

After the conflict is handled, the UCMG in FIG. 9 may be updated, as shown in FIG. 13, which illustrates an example of the post-settlement Unified Change Marking Graph (UCMG) according an embodiment of the invention. In FIG. 13 each node incurring conflict is traversed, and updated as only having one effective result manually or according to the above conflict settlement criteria.

After generating the post-settlement UCMG at step 1210, or if there is no conflict on all segment changes through the analysis of step 740 in FIG. 7, the process proceeds to step 1220. At step 1220, a new target model t2 is constructed. Step 1220 is performed sequentially with respect to each segment according to pre-defined reconciliation rules, either by reusing the segments of the post-change target t1 or being modified based on the segments of the post-change target model t1, or by transforming from the segments of the post-change source model s1 based on the post-settlement UCMG, and then combing both execution results together.

Assume that node.seg_s1 denotes a node's corresponding segment in s1, and node.seg_t1 denotes a node's corresponding segment in t1, the below reconciliation rules are applied to construct the segments of the new target model t2:

1. if the node's source mark 'N' and target mark 'N' are both kept, copy node.seg_t1 to t2;
2. if the node's source mark 'A' is kept, transform node.seg_s1 and add the resulting segment to t2;
3. if the node's target mark 'A' is kept, copy node.seg_t1 from t1 to t2;
4. if the node's source mark is 'M.sub_seg' and its target mark is 'M.sub_seg' as well, transform node.seg_s1.sub_seg and replace node.seg_t1.sub_seg with the resulting segment, and then copy the resulting node.seg_t1 to t2;
5. if only the node's source mark 'M.sub_seg' is kept, transform node.seg_s1.sub_seg and replace node.seg_t1.sub_seg with the resulting segment, and then copy the resulting node.seg_t1 to t2;
6. if only the node's target mark 'M.sub_seg' is kept, copy node.seg_t1 from t1 to t2; and
7. if the node's source mark 'D' or its target mark 'D' is kept, copy nothing to t2.

Figure 14:
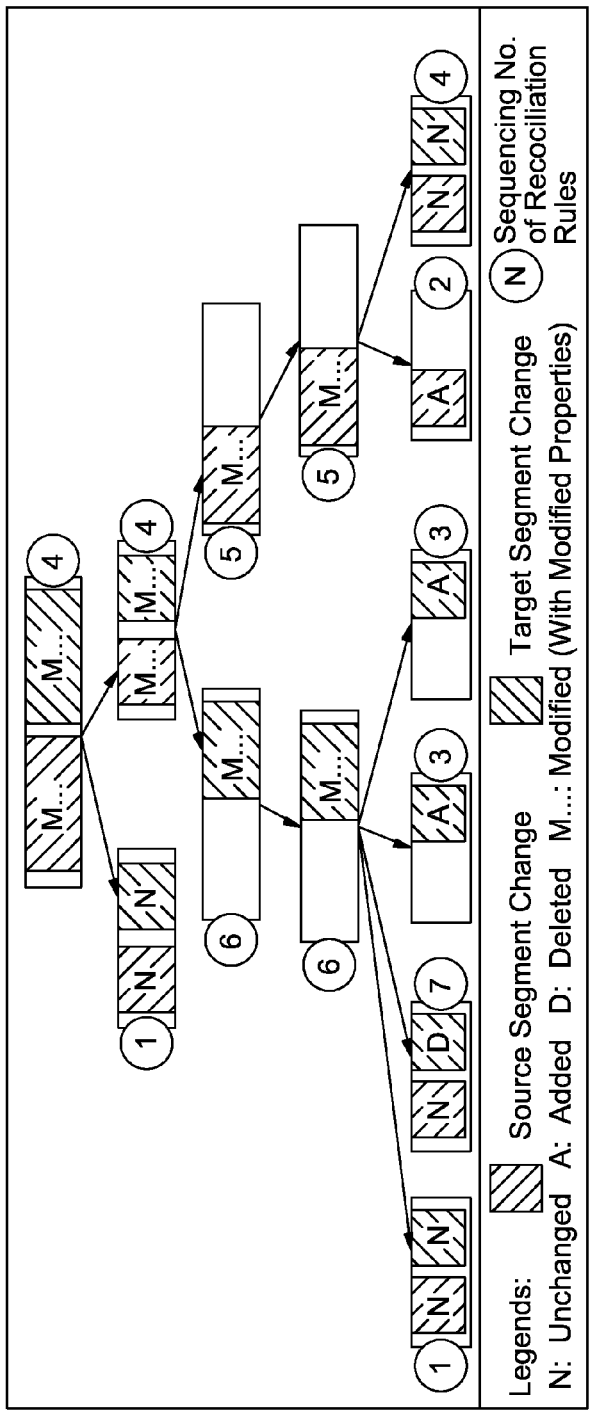
FIG. 14 illustrates an example of applying the reconciliation rules to all nodes of the exemplary UCMG of the invention, according to an embodiment of the invention.

FIG. 14 illustrates an example of applying the reconciliation rules to all nodes in the exemplary UCMG of the invention according to an embodiment of the invention. The number in each circle denotes the sequencing number of the above reconciliation rules applied to corresponding node. Note that the above reconciliation rules are not all inclusive or limiting. Additional rules can be added, and rules can be modified, deleted or combined to adapt to the actual demands of other embodiments of the invention.

Figure 15:
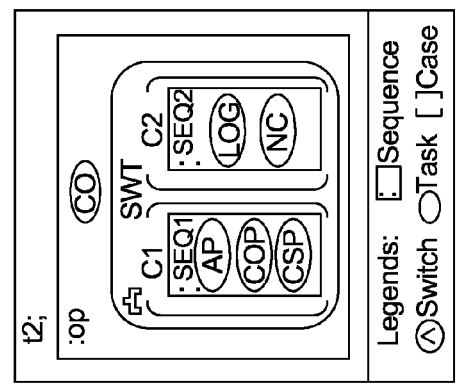
FIG. 15 illustrates a final new model t2 generated according an embodiment of the invention.

After applying the above reconciliation rules to all nodes in the exemplary UCMG of the invention, all segments of t2 can be obtained. A final model t2 is then generated by combining all model elements in the segments while removing duplicate elements at step 1220, as shown in FIG. 15, which illustrates a final new model t2 generated according an embodiment of the invention. In FIG. 15, all elements except the element LOG come from t1, and thus the solution developer need only concretize the element LOG, which greatly saves his effort. Note that the embodiment of the invention is only a simple example, however, in a large-scale model-driven developing process, such method of automatically reconciling model transformation can greatly improve working efficiency, save time, and enhance stability. Note that the above embodiment is for illustrative purpose only, and some steps may be added, deleted or combined without deviating from the essence of the invention.

Alternatively, in other embodiments of the invention, the above method may further comprise the following steps: establishing or adjusting by user manually various rules and criteria, such as model segmentation rules, segment relating rules, linkage existence decision criteria, segment comparison criteria, segment change identifying criteria, conflict identifying criteria, conflict settlement criteria, reconciliation rules, and etc.

Figure 16:
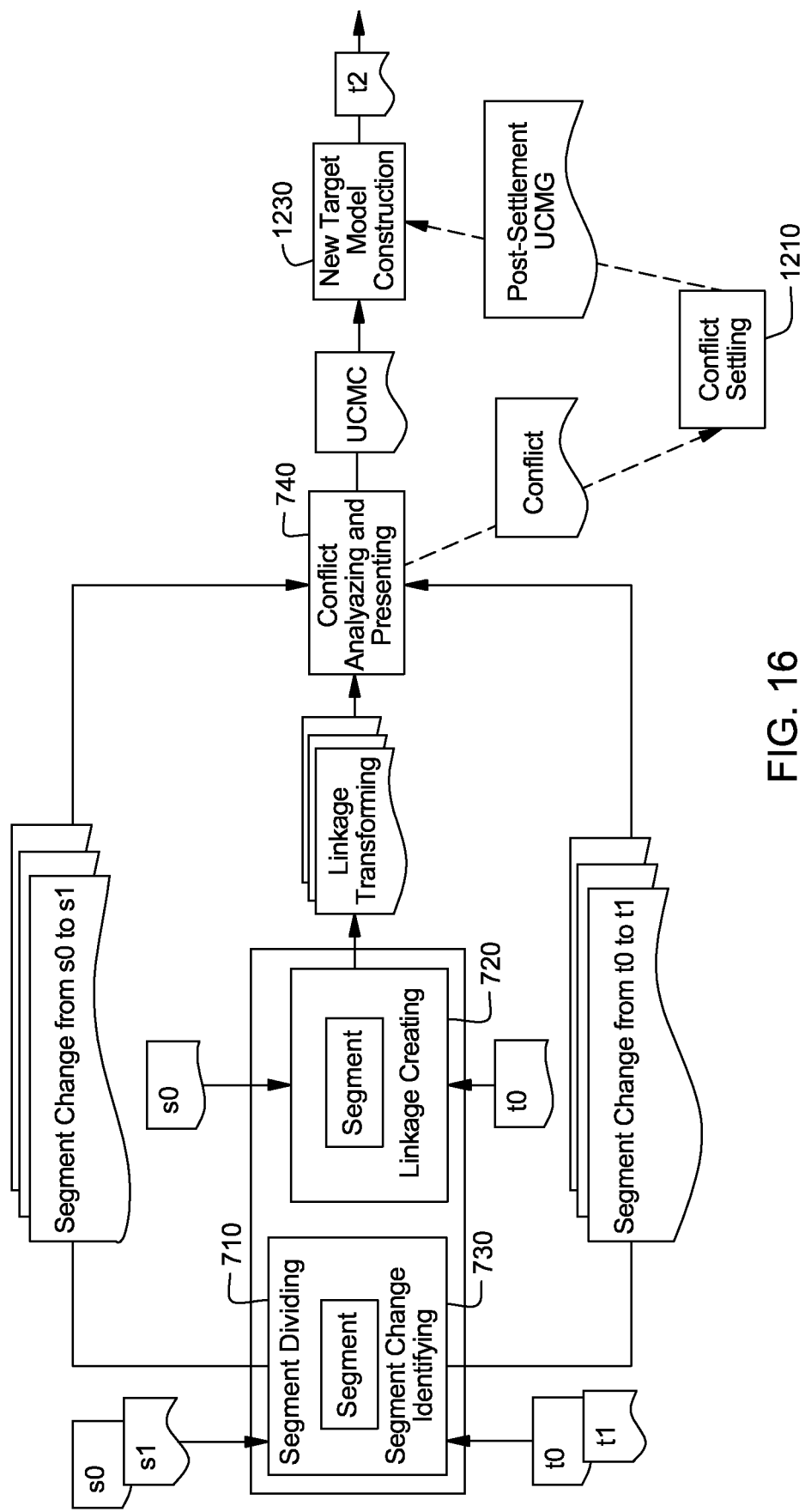
FIG. 16 illustrates the execution logic of a method for automatically reconciling model transformation, according to an embodiment of the invention.

FIG. 16 illustrates the execution logic of a method for automatically reconciling model transformation in model transformation according to the invention. It can be seen from FIG. 16, the input s0, s1, t0 and t1 can be divided into segments respectively (710), and the segment changes are identified (730), a linkage between s0 and t0 is created according to the actual transformation (720), and the conflict is analyzed and presented based on the transformation linkage and the segment changes from s0 to s1 and the segment changes from t0 to t1 (740). The above is same as the execution logic in FIG. 10. Then, if there are any conflicts according to the conflict analyzing result of step 740, the conflicts are settled (1210). Then a new target model t2 is constructed (1220) according to the post-settlement UCMG or the UCMG having no conflict.

Under the same inventive concept, the invention proposes a system for automatically reconciling model transformation. The system will be described hereinafter in detail in conjunction with drawings.

Figure 17:
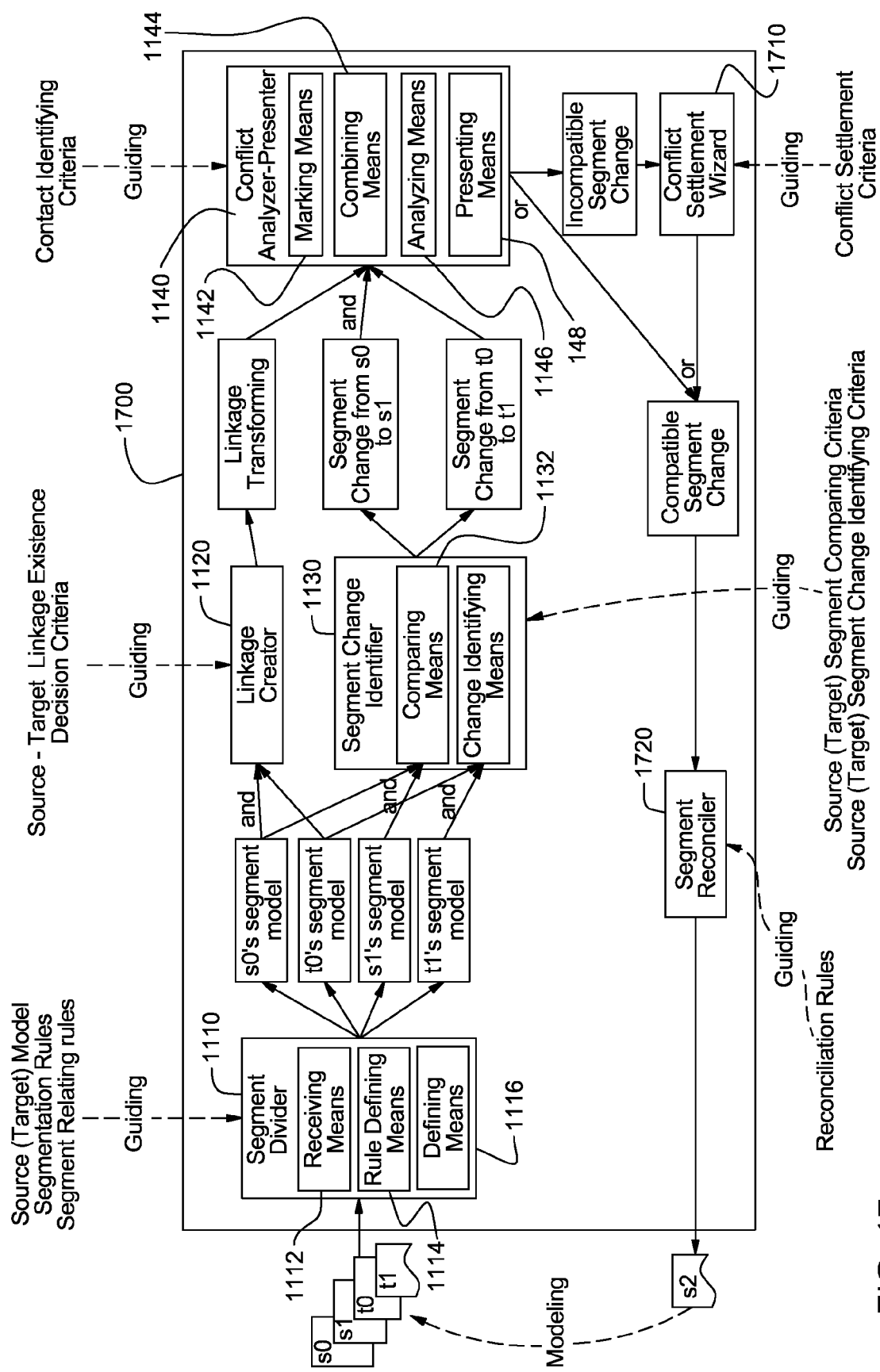
FIG. 17 illustrates a system for automatically reconciling model transformation, according to an embodiment of the invention.

FIG. 17 illustrates a system 1700 for automatically reconciling model transformation according to the invention. As shown in FIG. 17, the system 1700 comprises the system 1100 (as shown in FIG. 11) for analyzing and presenting the conflicts between source model changes and target model changes in model transformation according to the invention and further comprises conflict settlement wizard 1710 and segment reconciler 1720.

According to the conflict analyzing result of analyzing means 1146 in FIG. 11, in the case that there are any conflicts, conflict settlement wizard 1710 settles the conflicts between source model change and target model change. These conflicts can be batch-processed according to pre-defined conflict settlement criteria, or processed by user manually node by node. To improve efficiency and enhance stability, pre-define conflict settlement criteria are preferably required. The conflict settlement criteria have been described in detail in Table 5, and thus are not unduly repeated herein.

By applying these conflict settlement criteria to each node in the UCMG of FIG. 9 having conflict, it is possible to settle the conflicts (if they exist) between source segment and target segment on each node in the UCMG. In some embodiments, when there is a situation that the conflict settlement criteria do not involve, the user may handle the conflict on the node manually.

After conflict settlement wizard 1710 generates the post-settlement UCMG, or if there is no conflict on all segment changes through the analysis of conflict analyzer-presenter 1140 of FIG. 11, segment reconciler 1720 constructs a new target model t2. Segment reconciler 1720 sequentially processes each segment according to pre-defined reconciliation rules, either by reusing the segments of the post-change target model t1 or being modified based on the segments of t1, or by transforming from the segments of the post-change source model s1 based on the post-settlement UCMG, and then combining both execution results together. The reconciliation rules have been described above in detail, and thus are not unduly repeated. After applying the above reconciliation rules to all nodes in the exemplary UCMG of the invention, all segments of t2 can be obtained. Final t2 will be generated by segment reconciler 1720 combining all model elements in the segments while removing duplicate elements.

Alternatively, in other embodiments of the invention, the system 1700 may further comprise: storage, for storing the linkage between source segment and target segment and various rules and criteria, such as model segmentation rules, segment relating rules, linkage existence decision criteria, segment comparison criteria, segment change identifying criteria, conflict identifying criteria, conflict settlement criteria, reconciliation rules, and etc; and user interface, for the user manually establishing or adjusting the rules and criteria. Although these means are not clearly shown in the figure, those ordinary skilled in the art may understand that both the storage and the user interface are commonly known means in the art, and thus the detailed description thereof is omitted for simplicity.

The detailed description of a method and system for analyzing and presenting the conflicts between source model changes and target model changes in model transformation and a method and system for automatically reconciling model transformation of the invention is provided above. As appreciated by those of ordinary skill in the art, the present invention may be embodied as method, system, and/or computer program product. Therefore, the present invention can be embodied in the form of hardware, software, or the combination thereof. Additionally, the present invention may be embodied as a computer program product in the form of machine-readable media containing the computer executable program instructions for programming a computer system to execute one or more processes according to the invention. The term "machine-readable media" used herein refers to any media that provides a computer system with instructions for execution. Such media may take various forms, including but not limited to: non-volatile media, volatile media, and transmission media. Non-volatile media commonly comprise, for example, floppy disk, floppy magnetic disk, hard disk, magnetic tape, or any other non-volatile magnetic media; CD-ROM or any other non-volatile optical media; slotting card or any other non-volatile physical media with hole pattern; PROM, EPROM, EEPROM, flash memory, any other non-volatile memory chip or cartridge; or any other non-volatile media that can be read by computer system and are appropriate for storing instructions.

Additionally, it should be appreciated that each block in the flow chart or block chart and the combination of some blocks may be implemented by some computer program instructions. These computer program instructions may be provided to a general purpose computer, a specific purpose computer, or a processor of other programmable data processing device, to produce a machine, in which these instructions, when executed by the computers or the processor of other programmable data processing device, can realize the means for implementing the functions indicated by the blocks of the block chart and/or the flow chart.

Although the present invention has been presented and described specifically by reference to the preferred embodiments, it is not intended to be exhaustive or to limit the invention to the forms disclosed. Many modifications of forms and details will be apparent to those of ordinary skill in the art without deviating from the spirit and scope of the invention. The embodiments were chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reconciling computer application model conflicts, wherein the computer application models include i) an initial source computer application model, ii) an initial target computer application model generated by applying at least one transformation rule to the initial source computer application model, iii) a post-change target model produced by at least one change to the initial target model, and iv) a post-change source model produced by at least one change to the initial source model, the method comprising:

automatically dividing the initial source and target models and the post-change source and target models into segments responsive to at least one segmentation rule, wherein the at least one segmentation rule is defined responsive to the at least one transformation rule such that use of the at least one segmentation rule divides the initial source and target models into corresponding, isomorphic segments, wherein the initial source and target models have an isomorphic structure in common on which to mark changes;

automatically identifying change statuses of the initial segments relative to the post-change segments of the respective models responsive to comparing initial segments to post-change segments of the source model and initial segments to post-change segments of the target model; and automatically generating, on a data structure representing the in-common isomorphic structure, an indication of conflicts between the post-change source model and post-change target model for presentation to a user or to a computer automated conflict settlement process, wherein the generating is responsive to comparing the identified change statuses of the corresponding, isomorphic segments of the initial source model and initial target model, wherein at least part of the identifying and generating occurs after changes to both the initial source model and the initial target model.

2. The method of claim 1, wherein identifying change statuses includes:

identifying, for the respective source and target models, correspondence among the initial and post-change segments.

3. The method of claim 1, wherein the post-change segments include segments added by the at least one change to the respective initial models.

4. The method of claim 1, wherein identifying change statuses includes:

identifying change status for each pre-change segment relative to any corresponding existing or deleted post-change segment of the respective models.

5. The method of claim 1, wherein dividing the initial source and target models and the post-change source and target models into segments is further responsive to at least one segment relating rule.

6. The method of claim 1, wherein comparing initial segments to post-change segments of the source model and initial segments to post-change segments of the target model is responsive to predetermined segment comparison criteria, the criteria depending upon types of source and target segments and upon major and minor properties, and wherein the change statuses are selected from among statuses meaning that compared segments are: i) same, ii) different, but not totally different, and iii) totally different.

7. The method of claim 1, comprising:

creating a reconciled target model responsive to pre-defined reconciliation rules, wherein the reconciled target model has segments and the creating of the reconciled target model includes:

selecting each segment of the reconciled target model from one of the following segments:

a segment of the post-change target model, a modified segment of the post-change target model, and a transformed segment of the post-change source model.

8. A computer program product having instructions stored on volatile or non-volatile media readable by a computer system for reconciling computer application model conflicts, wherein the computer application models include i) an initial source computer application model, ii) an initial target computer application model generated by applying at least one transformation rule to the initial source computer application model, iii) a post-change target model produced by at least one change to the initial target model, and iv) a post-change source model produced by at least one change to the initial source model, said computer program product instructions being for execution by a computer, which, when executed by the computer, cause the computer to implement a method comprising:

automatically dividing the initial source and target models and the post-change source and target models into segments responsive to at least one segmentation rule, wherein the at least one segmentation rule is defined responsive to the at least one transformation rule such that use of the at least one segmentation rule divides the initial source and target models into corresponding, isomorphic segments, wherein the initial source and target models have an isomorphic structure in common on which to mark changes;

automatically identifying change statuses of the initial segments relative to the post-change segments of the respective models responsive to comparing initial segments to post-change segments of the source model and initial segments to post-change segments of the target model; and automatically generating, on a data structure representing the in-common isomorphic structure, an indication of conflicts between the post-change source model and post-change target model for presentation to a user or to a computer automated conflict settlement process, wherein the generating is responsive to comparing the identified change statuses of the corresponding, isomorphic segments of the initial source model and initial target model, wherein at least part of the identifying and generating occurs after changes to both the initial source model and the initial target model.

9. The computer program product of claim 8, wherein identifying change statuses includes:

identifying, for the respective source and target models, correspondence among the initial and post-change segments.

10. The computer program product of claim 8, wherein the post-change segments include segments added by the at least one change to the respective initial models.

11. The computer program product of claim 8, wherein identifying change statuses includes:

identifying change status for each pre-change segment relative to any corresponding existing or deleted post-change segment of the respective models.

12. The computer program product of claim 8, wherein dividing the initial source and target models and the post-change source and target models into segments is further responsive to at least one segment relating rule.

13. The computer program product of claim 8, wherein comparing initial segments to post-change segments of the source model and initial segments to post-change segments of the target model is responsive to predetermined segment comparison criteria, the criteria depending upon types of source and target segments and upon major and minor properties, and wherein the change statuses are selected from among statuses meaning that compared segments are: i) same, ii) different, but not totally different, and iii) totally different.

14. The computer program product of claim 8, wherein the method caused by the computer executing the instructions further comprises:

creating a reconciled target model responsive to pre-defined reconciliation rules, wherein the reconciled target model has segments and the creating of the reconciled target model includes:

selecting each segment of the reconciled target model from one of the following segments:
a segment of the post-change target model, a modified segment of the post-change target model, and a transformed segment of the post-change source model.

15. A computer system comprising: a processor; and a storage device connected to the processor, wherein the storage device has stored thereon a computer application model conflict reconciling program for controlling the processor, wherein the computer application models include i) an initial source computer application model, ii) an initial target computer application model generated by applying at least one transformation rule to the initial source computer application model, iii) a post-change target model produced by at least one change to the initial target model, and iv) a post-change source model produced by at least one change to the initial source model, and wherein the processor is operative with the program to execute the program for performing:
automatically dividing the initial source and target models and the post-change source and target models into segments responsive to at least one segmentation rule, wherein the at least one segmentation rule is defined responsive to the at least one transformation rule such that use of the at least one segmentation rule divides the initial source and target models into corresponding, isomorphic segments, wherein the initial source and target models have an isomorphic structure in common on which to mark changes;
automatically identifying change statuses of the initial segments relative to the post-change segments of the respective models responsive to comparing initial segments to post-change segments of the source model and initial segments to post-change segments of the target model; and
automatically generating, on a data structure representing the in-common isomorphic structure, an indication of conflicts between the post-change source model and post-change target model for presentation to a user or to a computer automated conflict settlement process, wherein the generating is responsive to comparing the identified change statuses of the corresponding, isomorphic segments of the initial source model and initial target model, wherein at least part of the identifying and generating occurs after changes to both the initial source model and the initial target model.

16. The computer system of claim 15, wherein identifying change statuses includes:
identifying, for the respective source and target models, correspondence among the initial and post-change segments.

17. The computer system of claim 15, wherein the post-change segments include segments added by the at least one change to the respective initial models.

18. The computer system of claim 15, wherein identifying change statuses includes:
identifying change status for each pre-change segment relative to any corresponding existing or deleted post-change segment of the respective models.

19. The computer system of claim 15, wherein comparing initial segments to post-change segments of the source model and initial segments to post-change segments of the target model is responsive to predetermined segment comparison criteria, the criteria depending upon types of source and target segments and upon major and minor properties, and wherein the change statuses are selected from among statuses meaning that compared segments are: i) same, ii) different, but not totally different, and iii), and totally different.

20. The computer system of claim 15, wherein the processor is operative with the program to execute the program for performing:
creating a reconciled target model responsive to pre-defined reconciliation rules, wherein the reconciled target model has segments and the creating of the reconciled target model includes:
selecting each segment of the reconciled target model from one of the following segments:
a segment of the post-change target model, a modified segment of the post-change target model, and a transformed segment of the post-change source model.

* * * * *